US005832453A

United States Patent [19]
O'Brien

[11] Patent Number: 5,832,453
[45] Date of Patent: Nov. 3, 1998

[54] COMPUTER SYSTEM AND METHOD FOR DETERMINING A TRAVEL SCHEME MINIMIZING TRAVEL COSTS FOR AN ORGANIZATION

[75] Inventor: Danamichele Brennen O'Brien, Philadelphia, Pa.

[73] Assignee: Rosenbluth, Inc., Philadelphia, Pa.

[21] Appl. No.: 215,991

[22] Filed: Mar. 22, 1994

[51] Int. Cl.⁶ .................................................. G06F 17/60
[52] U.S. Cl. .................................................. 705/6
[58] Field of Search .................. 364/401, 402, 364/406, 407; 235/384; 705/1, 5, 6, 7, 8

[56] References Cited

U.S. PATENT DOCUMENTS

| | | |
|---|---|---|
| 2,910,238 | 10/1959 | Miles . |
| 2,995,729 | 8/1961 | Steele . |
| 3,253,262 | 5/1966 | Wilenitz et al. . |
| 4,755,963 | 7/1988 | Denker et al. . |
| 4,775,936 | 10/1988 | Jung . |
| 4,845,625 | 7/1989 | Stannard . |
| 4,862,357 | 8/1989 | Ahlstrom et al. . |
| 4,931,932 | 6/1990 | Dalnekoff et al. . |
| 5,021,953 | 6/1991 | Webber et al. . |
| 5,191,523 | 3/1993 | Whitesage . |
| 5,237,499 | 8/1993 | Garback . |
| 5,253,165 | 10/1993 | Leiseca et al. . |
| 5,253,166 | 10/1993 | Dettelbach et al. . |
| 5,255,184 | 10/1993 | Hornick et al. . |
| 5,270,921 | 12/1993 | Hornick . |
| 5,331,546 | 7/1994 | Webber et al. . |
| 5,343,388 | 8/1994 | Wedelin . |
| 5,402,336 | 3/1995 | Spiegelhoff et al. . |

OTHER PUBLICATIONS

Nadine Godwin, "Agency Funded by 3M Set to Market Software", Travel Weekly, Oct. 13, 1986.
Nadine Godwin, "Agency Dares to Launch Its Own Air Res. System", Travel Weekly, vol. 45, No. 93, Oct. 23, 1986.
Travelmation Brochure, "Read This If You Think Saving Billions on Travel Is Worthwhile But Impossible", 1987.
Travelmation Brochure, "How to Create a Corporate Travel Policy That Works", 1987.
Travelmation Brochure, "What Exactly Do Travel Agencies Do? In Some Cases, Very Little".
Nadine Godwin, "New Software Was Key Lure in $17 Million Agency Buyout", Travel Weekly, Nov. 26, 1984.

Primary Examiner—Robert A. Weinhardt
Attorney, Agent, or Firm—Panitch Schwarze Jacobs & Nadel, P.C.

[57] ABSTRACT

A computer system and a method for determining a travel scheme minimizing travel costs for an organization, where the organization expects to purchase travel trips for a plurality of travelers for a plurality of travel links. Each travel link comprises a travel origin and a travel destination, and is served by at least one of the carriers. The system comprises a data input device for receiving travel information relating to the carriers and the links, a data storage device for storing the travel information received by the data input device, a processor, and a data output device. From the travel information, the system constructs an objective function representing a travel cost to the organization to purchase travel trips for the plurality of travelers for the plurality of predetermined links, and a set of constraints comprising restrictions relating to the objective function. The constraints are applied to the objective function to determine a solution of the objective function that satisfies the constraints and that minimizes the travel costs of the organization, and a data output device then generates a report representative of the solution. The travel information comprises travel cost information for each link for each carrier serving the link, demand and supply information pertaining to a projected demand for each link and a projected supply for each carrier, and carrier goal information pertaining to any predetermined goal the organization may have with respect to any of the carriers.

70 Claims, 4 Drawing Sheets

| on airline... | between city-pairs... PHL-SJU | PHL-LHR | PHL-BRU | PHL-MEX | PHL-EZE | Airline Supply or Hurdle |
|---|---|---|---|---|---|---|
| UA | | x1 $1,496.00 cap=5% | x2 $1,760.00 cap=30% | x3 $550.00 cap=5% | x4 $3,008.00 cap=5% | Hurdle $100,000 wcap=9% |
| BA | | x5 $1,558.00 cap=85% | x6 $1,730.00 cap=55% | | | Hurdle $150,000 wcap=28% |
| AA | x7 $355.00 cap=75% | x8 $1,474.00 cap=10% | x9 $1,804.00 cap=10% | x10 $567.00 cap=95% | x11 $3,076.00 cap=95% | Supply 190 wcap=57% |
| US | x12 $326.00 cap=25% | | | | | Supply 17 wcap=5% |
| SN | | | x13 $1,938.00 cap=5% | | | Supply 3 wcap=1% |
| Passenger Demand (segments) | 98 | 83 | 61 | 48 | 44 | 334 |

FIG. 5

| on airline... | between city-pairs... PHL-SJU | PHL-LHR | PHL-BRU | PHL-MEX | PHL-EZE | Actual Airline Supply or Hurdle, & Ranges | | |
|---|---|---|---|---|---|---|---|---|
| | | | | | | Lower limit | | Upper limit |
| UA upper limit: net cost: lower limit: Mrkt Share: | 68 | x1 = 0 infinity $1,496.00 $1,445.00 0% | x2 = 0 infinity $1,760.00 $1,605.00 0% | x3 = 0 infinity $550.00 $538.00 0% | x4 = 44 $3,047.00 $3,008.00 -infinity 100% | -infinity | Hurdle (revenue) $100,000 90 13% | $150,392 |
| BA upper limit: net cost: lower limit: Mrkt Share: | 92 90 | x5 = 21 infinity $1,558.00 $1,445.00 25% | x6 = 58 $1,885.00 $1,730.00 -infinity 95% | 70 88 | | $112,404 | Hurdle (revenue) $150,000 90 24% | $150,904 |
| AA upper limit: net cost: lower limit: Mrkt Share: | x7 = 80 $394.00 $355.00 $343.00 82% | x8 = 62 $1,525.00 $1,474.00 -infinity 75% | x9 = 0 infinity $1,804.00 $1,634.00 0% | x10 = 48 $579.00 $567.00 -infinity 100% | x11 = 0 infinity $3,077.00 $3,038.00 0% | 111 | Supply (segments) 190 90 57% | 191 92 |
| US upper limit: net cost: lower limit: Mrkt Share: | x12 = 18 $339.00 $327.00 $288.00 18% | 92 90 | | | | -infinity | Supply (segments) 18 5% | 18 92 |
| SN upper limit: net cost: lower limit: Mrkt Share: | | 70 | x13 = 3 infinity $1,938.00 $1,605.00 5% | 88 68 | | 0 | Supply (segments) 3 1% | 3 |
| Upper limit: Satisfied Demand: Lower limit: | infinity 98 97 | 163 83 82 | 80 61 61 | 128 48 47 | infinity 44 29 | | | |

FIG. 6

COMPUTER SYSTEM AND METHOD FOR DETERMINING A TRAVEL SCHEME MINIMIZING TRAVEL COSTS FOR AN ORGANIZATION

BACKGROUND OF THE INVENTION

The present invention relates to a computer system and a method for determining the distribution of transportation carrier support that will result in the lowest total travel cost for an organization. More particularly, the invention relates to a computer system and method for developing a model to represent an organization's travel requirements in order to maximize and leverage benefits obtained from individual transportation carriers.

Typically, a larger size organization will tend to purchase a significant amount of travel services from a number of travel carriers. For example, a large corporation having a headquarters office and several far-flung divisional offices, manufacturing plants, and the like may be expected to have its employees and/or representatives travel therebetween as well as to other locations in the ordinary course of business. Such an organization typically negotiates special incentive arrangements with one or more travel carriers in order to obtain a discount for supporting the travel carriers.

Nevertheless, a particular incentive arrangement may actually cost the organization more money than is being saved, for any of several reasons. For example, the organization may take advantage of a particular incentive arrangement by using a particular travel carrier to travel between a location A and a location B. However, in doing so, the organization may have to suffer the fact that the travel carrier does not provide fast and/or frequent service between the two locations.

Alternatively, the travel carrier may not provide added benefits that another travel carrier offers for traveling between the two locations. Still further, in supporting the one carrier, another less costly alternative may be ignored. Inevitably, the lack of an organized travel scheme causes the organization to incur significant additional total travel costs. Thus, it would be highly advantageous to have a system and method for organizing a coherent travel scheme based on the organization's travel demands, the negotiated travel incentives the organization has with particular travel carriers, and the service each travel carrier provides between particular travel locations, as well as several other factors, in order to minimize the total travel cost incurred by the organization.

SUMMARY OF THE INVENTION

The present invention is directed to a computer system and a method for determining a travel scheme for minimizing travel costs for an organization, where the organization expects to purchase travel trips for a plurality of travelers for a plurality of predetermined travel links. Each travel link comprises a travel origin and a travel destination, and is served by at least one of a plurality of travel carriers. The system comprises a data input device for receiving travel information relating to the carriers and the links, a data storage device for storing the travel information received by the data input device, a processor, and a data output device. The system constructs an objective function and a set of constraints from the travel information. The objective function represents a travel cost to the organization to purchase travel trips for the plurality of travelers for the plurality of predetermined links, and the constraints comprise restrictions relating to the objective function. The constraints are applied to the objective function to determine a solution of the objective function that satisfies the constraints and that minimizes the travel costs of the organization. The data output device then generates a report representative of the solution.

Preferably, the travel information comprises travel cost information for each link for each carrier serving the link, demand and supply information pertaining to a projected demand for each link and a projected supply for each carrier, and carrier goal information pertaining to any predetermined goal the organization may have with respect to any of the carriers. From the travel cost information for each link for each carrier serving the link, a weighted value representing an actual cost to the organization for traveling the link using the carrier is determined. Preferably, the objective function comprises the sum of a travel cost for each link, the travel cost for each link comprises the sum of a travel cost for each carrier serving the link, and the travel cost for each carrier serving the link comprises the weighted value representing the actual cost to the organization for traveling the link using the carrier multiplied by a variable representing a number of trips to be purchased from the carrier for the link.

Preferably, the constraints are derived from the demand and supply information and the carrier goal information. Also preferably, the constraints comprise link demand constraints, carrier supply constraints, and carrier goal constraints. The link demand constraints require that for each link the sum of the variables representing the number of trips to be purchased from all carriers for the link be equal to the projected demand for the link. The carrier supply constraints require that for a particular carrier the sum of the variables representing the number of trips to be purchased from the carrier for all links be in a predetermined range. Each carrier goal constraint requires that the goal the organization has with respect to a particular carrier be accomplished.

Preferably, the information is organized in the form of a matrix or table, where each of the plurality of links is laid out in a first direction, each of the plurality of carriers is laid out in a second direction, and each carrier serving a particular link is designated by a cell having information pertaining thereto. Also preferably, the link demand information is organized according to each link and the carrier supply information and the carrier goal information is organized according to each carrier. Preferably, linear programming is implemented to apply the constraints to the objective function to determine the solution. Information from the solution may be communicated from the computer system to point of sale terminals for use in setting travel arrangements.

The computer system and method are preferably employed by a travel agency to provide a travel optimization service to an organization. The fee for the service may comprise a portion of the savings realized to the organization by employing the travel optimization service.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF PREFERRED EMBODIMENTS

Certain terminology may be used in the following description for convenience only and is not limiting. The words "right", "left", "upper" and "lower" designate directions in the drawings to which reference is made. The words "inwardly" and "outwardly" are further directions toward and away from, respectively, the geometric center of the Referenced element. The terminology includes the words above specifically mentioned, derivatives thereof, and words of similar import.

Figure 1:
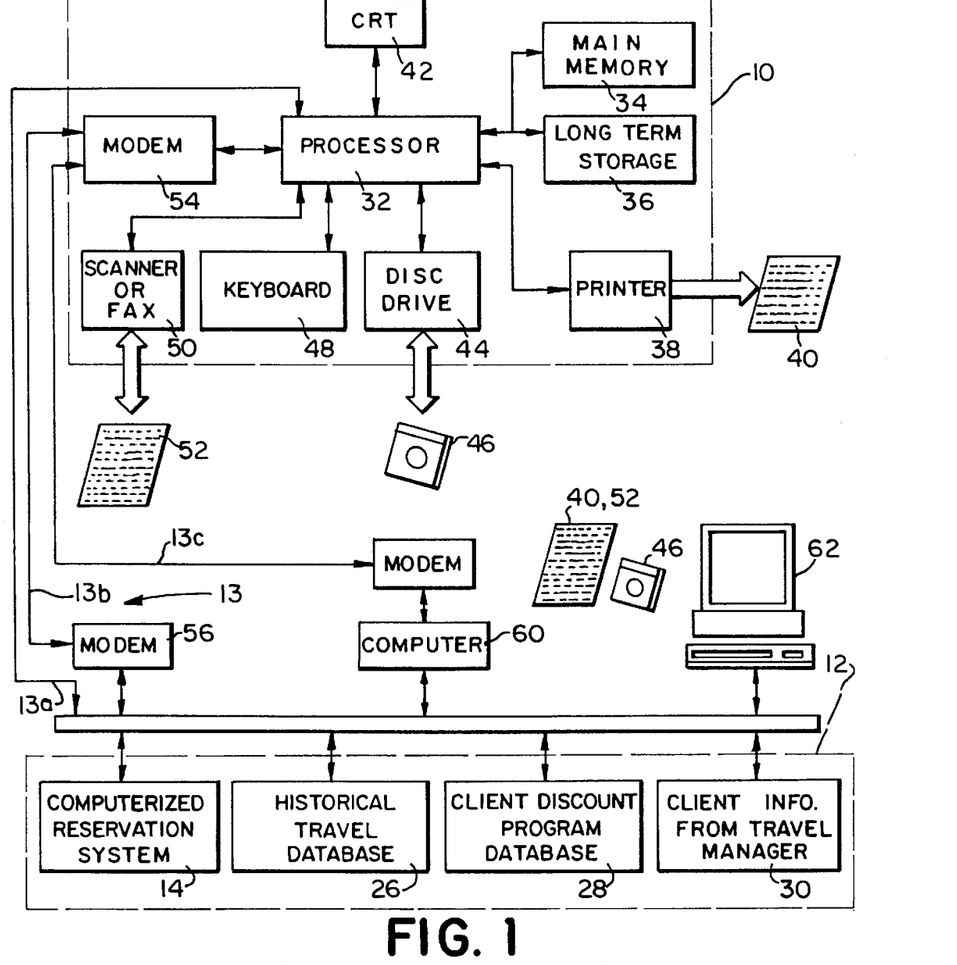
FIG. 1 is a schematic block diagram of a computer system for determining a travel scheme minimizing travel costs for an organization in accordance with the present invention.

Referring to the drawings in detail, wherein like numerals are used to indicate like elements throughout, there is shown in FIG. 1 a block diagram of a computer system 10 in accordance with the present invention. The computer system 10 may include a centralized main-frame computer having extended storage and processing capacity and the ability to interface with a plurality of local and remote external data sources, such as an IBM E90 mainframe computer. Alternatively, the computer system 10 may include a personal computer (not shown) having the proper power, programming, components, and external data access capabilities. For example, an IBM PS/2 Model 90 XP486 personal computer may be employed. However, one skilled in the art will recognize that the computer system 10 may be any computer system having the ability to perform the functions to be described below.

As seen in FIG. 1, the computer system 10 is bidirectionally linked to a plurality of data sources 12, via a plurality of communications links 13. Preferably, one of the data sources 12 is a computerized travel reservation system (CRS) 14. The CRS 14 may comprise one or more of the computerized reservation systems widely used by travel agents to gather travel data and make travel reservations. Typically, such a computerized reservation system contains travel information on most if not all regularly scheduled travel services provided by most if not all major travel carriers. Such information includes, but is not limited to, the scheduled departure and arrival time for each travel service, the current fare or fares for the travel service, the number of travel services offered between a particular travel origin and a particular travel destination, whether a particular travel service requires a connection or stop-over, and if so, the connection or stop-over time, as well as other information relating to the travel services. As may be recognized, a connection comprises a physical change of travel vehicles at a connecting location while a stop-over comprises a stop at a connection location without a physical change of travel vehicles. Preferably, the computer system 10 can transmit information to as well as receive information from the CRS 14. Such information may be transmitted and received via well-known protocols.

Figure 2:
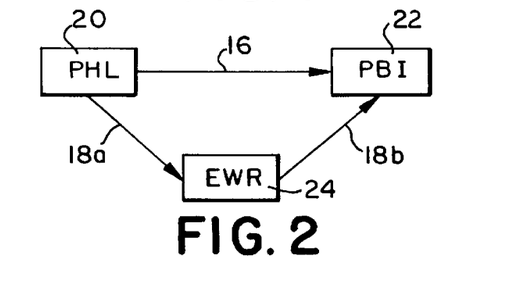
FIG. 2 is a schematic block diagram of a typical travel link.

As should be recognized, the term "travel service" refers to airline travel if the travel provider is an airline, rail travel if the travel provider is a railroad line, and the like. As may be expected, though, the large majority of travel service provided will be air travel provided by air carriers. As should also be recognized, and as shown in FIG. 2, travel between a travel origin and a travel destination may be accomplished either directly or via a connection or stopover. For example, when traveling between Philadelphia, Pa. (PHL) and Palm Beach, Fla. (PBI), the CRS 14 may show a direct air flight 16 offered by USAir Airlines (US), and a series of connecting air flights 18A from PHL to Newark, N.J. (EWR) and 18B from EWR to PBI offered by Continental Airlines (CO). Thus, the travel link comprising the travel origin 20 of PHL and the travel designation 22 of PBI may be served by at least two carriers, with one carrier offering at least a direct flight 16 and the second carrier offering at least a series of connecting flights 18A and 18B. As is known, several other carriers may provide service for the PHL-PBI travel link, and those carriers may offer direct flights 16 and/or a series of connecting flights 18A and 18B connecting through several intermediary travel connections 24.

Referring to FIG. 1 again, the data sources 12 also preferably include an historical travel database 26 having information including, but not limited to, records concerning travel previously performed or arranged to be performed on behalf of the organization. Such information is preferably used to compile travel statistics for the organization, including the demand for particular travel links, and historical patterns for using particular travel carriers. However, one skilled in the art will recognize that the historical travel database 26 may also include other travel information pertinent to the organization, and that other pertinent travel statistics may be compiled or derived from the travel information.

Preferably, the data sources 12 further include a client or organization discount program database 28 including information from the organization representative of incentives and discounts the organization has negotiated with particular travel carriers. For example, a particular organization or client may have negotiated a discount from United Airlines (UA) wherein the organization automatically receives a ten percent discount on fares. Similarly, the organization may have negotiated a discount arrangement with American Airlines (AA) wherein the organization will receive a twenty percent discount on all fares only if the organization preferentially travels a particular travel link via the airline. Still further, the organization may have negotiated preferential seating arrangements with British Airways (BA) on flights to London only if the organization purchases a predetermined number of travel trips from the airline. Here, the term "travel trip" refers to a trip on a particular travel link.

Preferably, the data sources 12 also include particular client and/or organization information from the organization travel manager or the like 30. Such information includes, but is not limited to, predetermined travel preferences an organization may have, travel policies or rules the organization may have, and the like. For example, an organization may wish to give a preference to Delta Airlines (DL) wherever possible, since the organization wishes to negotiate better travel incentives with carrier DL sometime in the future. Also, the information 30 may include details that the organization wishes to emphasize such as preferred connecting times, when to choose a direct route over a connecting route, the preferred times of day for departing and arriving, and the like.

As will be recognized, the data sources 12 may include other specific sources of electronic- and paper-based data and the like. Additionally, it will be recognized that information detailed above as being available from one particular data source 12 may in fact be available from another particular data source 12.

Preferably, the computer system 10 includes a main processor 32 which has adequate power to receive and process large amounts of travel information from the various data sources 12. One skilled in the art will recognize that any suitable processor 32 may be used in the computer system 10 without departing from the spirit and scope of the invention.

Travel information received by the processor 32 may be stored in a main memory 34 for immediate access or in a longer term storage 36 when immediate access is not necessary. One skilled in the art will recognize, however, that circumstances may require the exclusive use of the main memory 34 or the longer term storage 36. Preferably, the main memory 34 is a semiconductor memory and the longer term memory 36 is a non-volatile memory such as a hard disk, magnetic tape, PROM or a floppy disk. However, the invention is not limited to such devices and suitable substitutes may be used.

Preferably, computer system 10 includes a printer 38 for printing output data 40 associated with the computer system 10. Such output data 40 may include, but is not limited to, a travel analysis of an organization, information received by the computer system 10 from the data sources 12, calculations performed on the information from the data sources 12, and the like. Moreover, printer 38 may be employed to print output data 40 concerning the status of the computer system 10 or any of the data sources 12. As will be recognized, printer 38 may be any suitable printer that can be interfaced with computer system 10 and processor 32. Preferably, the printer 38 has the capability to print the information output from the computer system 10.

Preferably, the computer system 10 includes a CRT or monitor 42 attached to the processor 12 to enable a user of the system 10 to view information associated with the computer system 10. Also preferably, the computer system 10 includes a disk drive 44 for allowing the transfer of data between the computer system 10 and a remote location by means of a compatible floppy disk 46 or magnetic tape. As one skilled in the art will recognize, disk drive 44 and floppy disk 46 can be of any suitable type. Data received by the computer system 10 from the disk drive 44 may be actively used in the processor 12, displayed on the monitor 42, retained in main memory 34 or the longer term memory 36, or a combination thereof. A keyboard 48, also associated with the processor 12, allows a user to actively input data into the processor 12. The keyboard 48 may be a conventional ASCII or other type keyboard which is suitable for use with the processor 12.

A scanner or a facsimile machine 50 may also be associated with the processor 12 to allow data in the form of a printed document 52 to be inputted to or outputted from the processor 12. With the scanner or facsimile machine 50, the printed document 52 can be scanned and transmitted in the form of electrical data signals to the processor 12 in the manner which is well-known in the art. The data signals may then be displayed on the monitor 42 or stored in the main memory 34 or longer term storage 36 for later use.

Data can also be received or transmitted from or to a remote location by use of a modem 54 via communications links 13b or 13c. As seen in FIG. 1, communications link 13b interconnects the modem 54 with a remote modem 56 having direct access to at least one of the data sources 12. Similarly, communications link 13c interconnects the modem 54 with a remote modem 58 which can access at least one of the data sources 12 via a computer 60. Still further, a communications link 13a may directly interconnect the processor 12 with at least one of the data sources 12.

Data may also be exchanged between at least one of the data sources 12 and the computer system 10 by way of floppy disk 46, output data 40, and/or printed document 52. Accordingly, a computer 62 having access to a data source 12 would be provided with the proper disk drive, scanner, printer, and/or other data transfer device for purposes of inputting and outputting information. As one skilled in the art will recognize, other means for transferring data between the data sources 12 and the computer system 10 may be employed while still being within the spirit and scope of the present invention.

With the computer system 10 and data sources 12 as shown in FIG. 1, a travel scheme for minimizing travel costs for an organization is determined in the following manner. Preliminarily, an seen at step 301 in FIG. 3, the computer system 12 obtains the necessary travel information from the data sources 12. The travel information obtained may be stored either in the main memory 34, the longer term storage 36, or both. Preferably, the processor 32 uses the information to construct a matrix or table (hereinafter "table"), as seen in FIG. 5.

Figure 4:
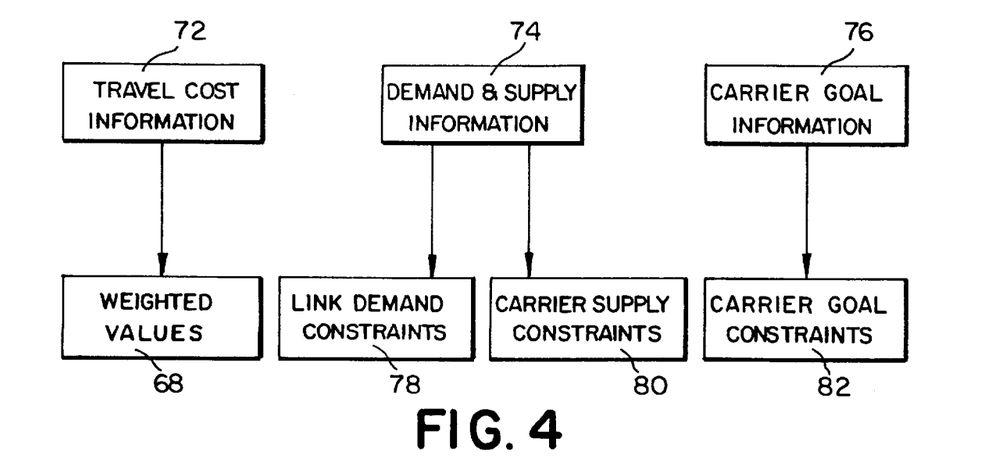
FIG. 4 is a flow diagram of the data in the system of FIG. 1.

As seen in FIG. 4, the travel information comprises travel cost information 72, demand and supply information 74, and carrier goal information 76. The travel cost information 72 is used to determine weighted values representative of the actual cost of traveling particular links using particular carriers. The demand and supply information 74 is used to determine link demand constraints 78 and carrier supply constraints 80. The carrier goal information 76 is used to determine carrier goal constraints 82.

Figure 5:
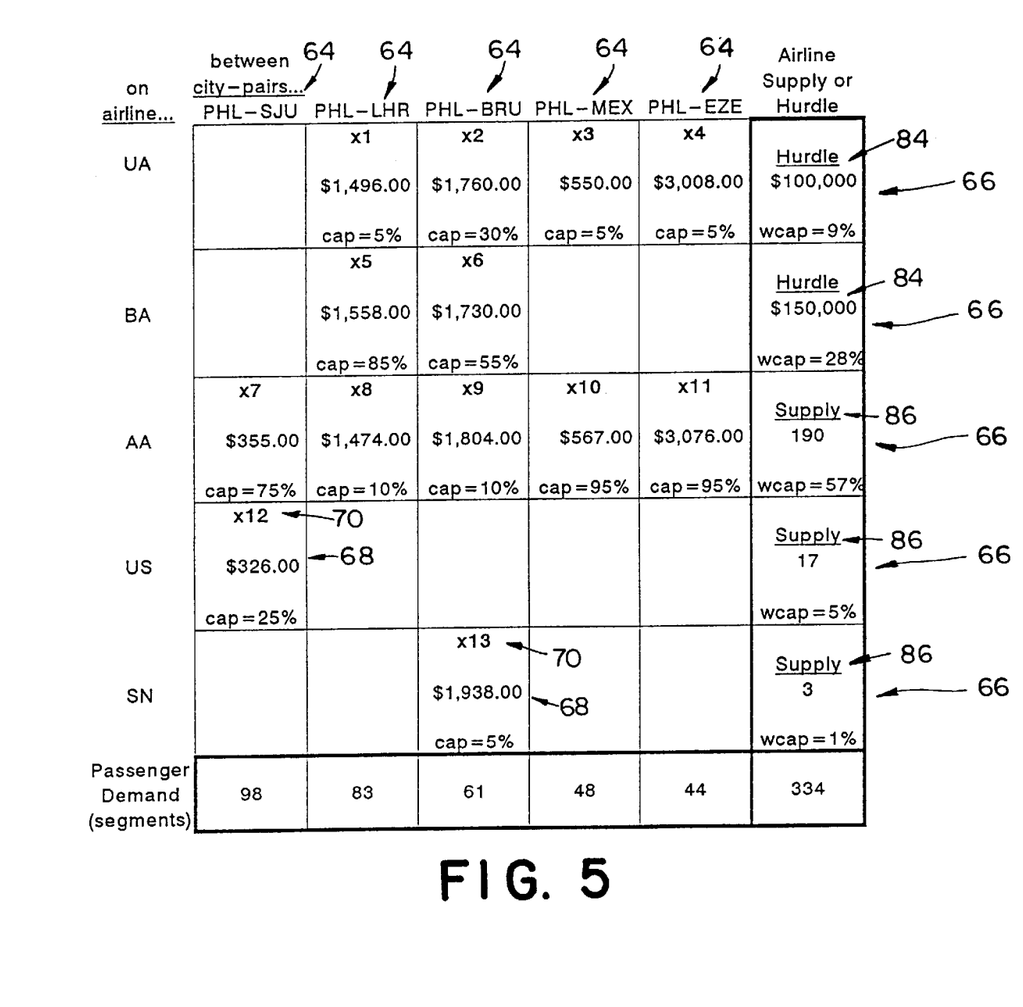
FIG. 5 shows a matrix or table comprising typical input information for the system of FIG. 1.

The table of FIG. 5 is organized in columns 64 and rows 66, with each column 64 having information representative of a particular travel link and each row 66 having information representative of a particular travel carrier. Thus, a cell at the intersection of a particular column 64 and a particular row 66 holds information representative of a particular travel carrier serving a particular travel link, should in fact the carrier serve the link. As seen in the table, the travel carrier for each row 66 is identified in the left-most column and the travel link for each column 64 is identified in the upper-most row.

The table as described may have any number of rows 66, each row 66 representing a travel carrier, and may have any number of columns 64, each column 64 representing a travel link. Preferably, each carrier and each travel link included in the table is predefined according to client and/or organization information received from the travel manager 30, as seen in FIG. 1. However, such information could also be obtained from the historical travel database 26, as well as other data sources 12. In any case, it is preferable that the travel links appearing in the table are those travel links that are most often used by the travelers of the organization, and that the carriers appearing in the table are those carriers that have scheduled service for the aforementioned travel links, as well as those carriers with which the organization has arranged travel incentives.

Once the structure of the table is defined, the computer system 10 uses the travel cost information 72 obtained with respect to each link and each carrier serving that link to determine for each carrier serving each link a weighted value 68 representative of the actual cost of traveling the link using the carrier. Each weighted value 68 is preferably expressed in terms of monetary units (e.g. dollars), and is placed in the appropriate cell.

As an example, a weighted value 68 may take into consideration that a carrier charges an actual cost of C for a travel trip on a link, and that a discount of D percent is given to the organization. Thus, the weighted value 68=C* (1−D). If the weighted value 68 also takes into account that the carrier provides an upgrade worth U, then the weighted value 68=C*(1−D)−U. If the weighted value still further takes into account that all voyages on the link require a connection with a connection delay of H hours, and that the value of time is V, then the weighted value 68=C* (1−D)−U+V*H. As may be surmised, the weighted value 68 may take into account all factors that affect the cost of traveling a particular link using a particular carrier. Such factors may include probabilistic factors.

Thus, for each carrier serving each link, travel cost information 72 from the appropriate data sources 12 is obtained in order to determine such factors as the expected fare or fares of the carrier, any discounts the carrier provides to the organization, any added costs and any benefits received in connection with traveling the link using the carrier, the number of non-stop voyages and connecting voyages available on the link from the carrier, any expected transfer delays, and the percentage of total voyages the carrier provides for the link, as well as other pertinent travel information.

Preferably, the expected fare or fares that the carrier charges for traveling the link are obtained from the CRS 14 and/or the historical travel database 26 and take into account seasonal variations in the fares. Preferably, any discounts the carrier provides the organization is determined from the client or organization discount program database 28, and takes into account any incentive the carrier may provide, as well as any negotiated arrangements the organization may have with the carrier. Preferably, any added costs and any benefits received in connection with traveling the link using the carrier include factors that either provide a benefit or a detriment to the traveler. For example, a benefit may be a seating upgrade or some other special service, and a detriment may be extra baggage costs or the like. Preferably, the number of non-stop voyages and connecting voyages available from the carrier for the link is obtained from the CRS 14.

With all of the aforementioned factors, as well as others, the computer system 10 determines for each carrier serving each link a weighted value 68 representative of the actual cost of traveling the link using the carrier, and places the weighted value 68 in the appropriate cell, as seen in the table of FIG. 5. Several cells are unoccupied, indicating that the carrier in the relevant row 66 does not serve the link in the relevant column 64 or that the carrier for other reasons should not be considered. Such a reason may be that the organization refuses to allow the carrier to serve its employees and/or representatives in connection with the relevant link, among other reasons. As one skilled in the art will recognize, the method for producing each weighted value 68 may be any one of several methods that properly takes into account each factor considered pertinent.

Each occupied cell is assigned a variable/designation 70 that both refers to the particular cell and acts as a variable representing the number of trips to be purchased from the carrier for the link represented by the cell.

For each link as represented by a column 64, the computer system 10 determines a relative capacity for each carrier serving the link. The relative capacity is determined from information obtained from the CRS 14 and represents the relative service each carrier provides the link. The relative capacity may also be weighted depending on the type of service provided by the carrier for the link. For example, in the PHL-LHR (London, Heathrow, England) link, the carrier UA provides five percent of the voyages serving the link, carrier BA offers eighty-five percent of the voyages serving the link, and carrier AA offers ten percent of the voyages serving the link. As one skilled in the art will recognize, the relative capacity for each carrier serving a particular link may be readily determined based on the number of voyages offered by the carrier for the link and the total number of voyages offered by all carriers for the link, for example.

The demand and supply information 74 obtained by the computer system 10 is used to determine a projected demand for each link and a projected supply for each carrier, and may be received from several of the data sources 12. For example, the historical travel database 26 may contain information showing that the organization has had an average demand of sixty-one segments for the PHL-BRU (Brussels, Belgium) link. Alternatively, client information from the travel manager 30 may reveal that because of an upcoming event, the organization will have a passenger demand of forty-eight segments for the PHL-MEX (Mexico City, Mexico) link. As will be recognized, the passenger demand for each link may be determined based upon any of several well-known techniques for forecasting demand. For example, the demand for a link may reflect actual past usage of the link as well as any projected changes. Similarly, the demand may reflect a projected usage based on expected travel needs. Once the passenger demand for each link is determined, such link demand information is organized in the table according to each link. Accordingly, and as seen in FIG. 5, the link demand information is found in the lower-most row.

From the link demand information and from the determined relative capacities for each carrier serving a link, carrier supply information may be determined. For example, since carrier AA in the table in FIG. 5 has a relative capacity of seventy-five percent for link PHL-SJU (San Juan, Puerto Rico), and since the link PHL-SJU has a passenger demand of ninety-eight, it is to be expected that, absent other factors, seventy-five percent of the ninety-eight passenger demand or approximately seventy-four passengers would be served by carrier AA. Similarly, an expected number of passengers to be served may be determined from each of the other links served by carrier AA. The sum of all the expected passengers for all links served by carrier AA, one hundred ninety, represents the expected carrier supply or goal value 86 for carrier AA, absent other factors. Similarly, carrier supply information may be determined for each of the other carriers in the table.

Alternatively, carrier supply information for a particular carrier may be replaced by carrier goal information 76 which pertains to any predetermined goal the organization may have with respect to the carrier. For example, the organization may have previously negotiated a discount with carrier UA wherein the discount is received only if carrier UA receives a minimum predetermined amount of business from the organization. Such carrier goal information 76 is represented by a hurdle 84 of $100,000 in the right-most column at the row 66 for carrier UA, as seen in the table in FIG. 5.

Alternatively, the carrier goal information 76 may represent a goal on the part of the organization to heavily support one carrier, or lightly support another carrier. In such a case, the carrier supply or goal value 86 originally determined to represent the anticipated carrier supply would be adjusted up or down, as the case may be, to represent a goal of the organization, and inserted in the table in FIG. 5 in the right-most column at the row 66 corresponding to the relevant carrier as a carrier supply or goal value 86. As may be recognized, each carrier supply or goal value 86 may be adjusted freely depending on any maximum or minimum value the organization wishes to achieve. Thus, the right-most column of the table of FIG. 5 has values representing supplies and goals, each supply value requiring that for a particular carrier the sum of the variables representing the number of trips to be purchased from the carrier for all links be either above or below the supply value, and each goal value requiring that the goal the organization has with respect to a particular carrier be accomplished. As may be recognized, the demand and supply information 74 and the goal information 76 may be updated according to goals and supplies already fulfilled.

Figure 3:
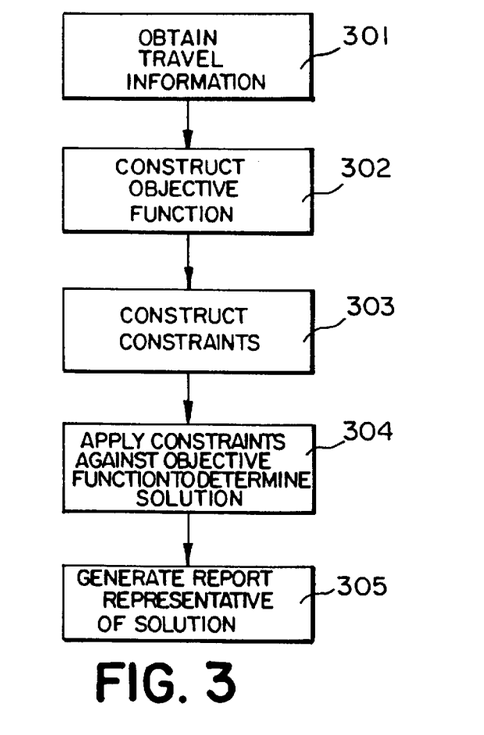
FIG. 3 is a flow diagram of the functions performed by the system of FIG. 1.

Once a table as seen in FIG. 5 has been constructed from the information 72, 74, and 76, the computer system 12 constructs an objective function, as seen at step 302 in FIG. 3. The objective function represents the total travel cost to the organization for purchasing travel trips for travelers traveling on behalf of the organization on the plurality of predetermined travel links using the plurality of predetermined travel carriers. Preferably, the objective function comprises the sum of a travel cost for each link wherein the travel cost for each link comprises the sum of the travel cost for each carrier serving the link. In order to determine the travel cost for each carrier serving the link, the weighted value 68 assigned to the cell for the carrier serving the link is multiplied by the variable 70 representing the number of trips to be purchased from the carrier for the link.

For example, and with reference to the table of FIG. 5, since thirteen cells are occupied, the objective function constructed from the table would be the sum of thirteen factors, each factor comprising the weighted value in a particular cell multiplied by the variable 70 representing that cell. Specifically, the objective function would be:

($1496*x1)+($1760*x2)+($550*x3)+($3008* x4)+($1558*x5)+
($1730*x6)+($355*x7)+($1474*x8)+($1804*x9)+($567*x10)+
($3076 *x11)+($326*x12)+($1938*x13)

Since any travel scheme determined must minimize the travel costs for an organization, the objective function as constructed should be minimized. In order to do so, the computer system 12 constructs constraints, as seen in step 303 of FIG. 3, and applies the constraints to the objective function, as seen in step 304 of FIG. 3, in order to determine a solution of the objective function that satisfies the constraints and minimizes the travel costs of the organization. Accordingly, the constraints must be produced from the demand and supply information 74 and the carrier goal information 76 determined with respect to the organization and placed in the table of FIG. 5.

Thus, each value in the lower-most row representing a passenger demand for a link is used to construct a link demand constraint 78. For example, in the column 64 representing the PHL-MEX link, the link demand constraint 78 would require that the sum of the variables representing the number of trips to be purchased from each carrier for the link, i.e., x3+x10, be equal to the passenger demand of 48. For the table of FIG. 5, five link demand constraints 78 are determined as follows:

| | |
|---|---|
| x7 + x12 = 98 | (PHL-SJU constraint) |
| x1 + x5 + x8 = 83 | (PHL-LHR constraint) |
| x2 + x6 + x9 + x13 = 61 | (PHL-BRU constraint) |
| x3 + x10 = 48 | (PHL-MEX constraint) |
| x4 + x11 = 44 | (PHL-EZE constraint) |

(EZE represents Buenos Aires, Argentina).

Similarly, each value in the right-most column representing demand and supply information 74 or carrier goal information 76, as the case may be, is used to construct carrier supply constraints 80 or carrier goal constraints 82, as the case may be. For example, a hurdle 84 of $150,000 is seen in the right-most column in the cell corresponding to the row 66 for the carrier BA. Accordingly, the organization requires that at least $150,000 of business be given to carrier BA by purchasing trips on the PHL-LHR and PHL-BRU links from carrier BA. From the hurdle information in the table of FIG. 5, the following carrier goal constraints 82 are constructed:

| | |
|---|---|
| $1600 * x1 + $1900 * x2 + $625 * x3 + $3418 * x4 > = $100,000 | (UA hurdle contraint) |
| $1750 * x5 + $1938 * x6 > = $150,000 | (BA hurdle constraint) |

The values $1600, $1900, $625, $3418, $1750, and $1938 are all assumed to be the actual pre-discounted costs charged by the various carriers for trips in connection with cells x1, x2, x3, x4, x5, and x6, respectively. Such pre-discounted costs are required in order to determine whether the hurdles 84 have been achieved.

Finally, carrier supply constraints 80 and/or carrier goal constraints 82 are constructed for each carrier where a carrier supply or goal value 86 is displayed in the right-most column in a cell corresponding to the row 66 of the carrier. For example, since the supply or goal value 86 of 17 has previously been determined for the carrier US in the table of FIG. 5, the variable x12 representing the number of trips to be purchased from the carrier US for the link PHL-SJU should be greater than or equal to the carrier supply or goal value 86 of 17. Accordingly, the following carrier supply constraints 80 and/or carrier goal constraints 82 are constructed:

| | |
|---|---|
| x7 + x8 + x9 + x10 + x11 >= 190 | (AA constraint) |
| x12 >= 17 | (US constraint) |
| x13 >= 3 | (SN constraint) |

(SN represents Sabena Airlines).

Although each of the above carrier supply constraints 80 and/or carrier goal constraints 82 requires the sum of the variables to be greater than or equal to the carrier supply or goal value 86, it should be recognized that an organization may choose to have the sum of the variables be less than the carrier supply or goal value 86 for any of a variety of reasons. For example, the organization may wish to limit business given to a particular carrier since the service provided by the carrier has been deemed sub-standard.

With the link demand constraints 78, the carrier supply constraints 80, and the carrier goal constraints 82 constructed, the processor 12 may then apply the constraints to the objective function to determine a solution of the objective function that satisfies the constraints and that minimizes the travel costs of the organization, as seen at step 304 in FIG. 3.

Preferably, the table as seen in FIG. 5 is embodied in a computer spreadsheet. Also preferably, the computer system 10 includes software for extracting information from the spreadsheet to construct the objective function and the set of constraints, and linear programming software for applying the constraints to the objective function to determine a solution. Preferably, the linear programming software includes the software for extracting the information.

As may be recognized, linear programming represents a technique for solving multi-variable systems in terms of a set of best values for maximizing or minimizing the system. Essentially, the linear programming allocates the trips to the carriers in accordance with the travel information and the constraints to provide a first test travel scheme, and determines the cost of the first test travel scheme. The trips are then re-allocated to provide a second test travel scheme, and the cost of the second test travel scheme is determined and compared with the cost of the first test travel scheme. The process is repeated until an optimum travel scheme minimizing the travel costs in accordance with the travel information and the constraints is determined.

Preferably, the linear programming software determines the solution according to a transportation algorithm. As one skilled in the art will recognize, a transportation algorithm minimizes the cost of a two-dimensional universe, each dimension having a plurality of members, subject to constraints on each of the members of each of the dimensions. More preferably, the spreadsheet is a "LOTUS-123"-type spreadsheet and the linear programming software comprises "WHAT'S BEST!" linear programming software, a product of Lindo Systems, Inc. of Chicago, Ill.

Figure 6:
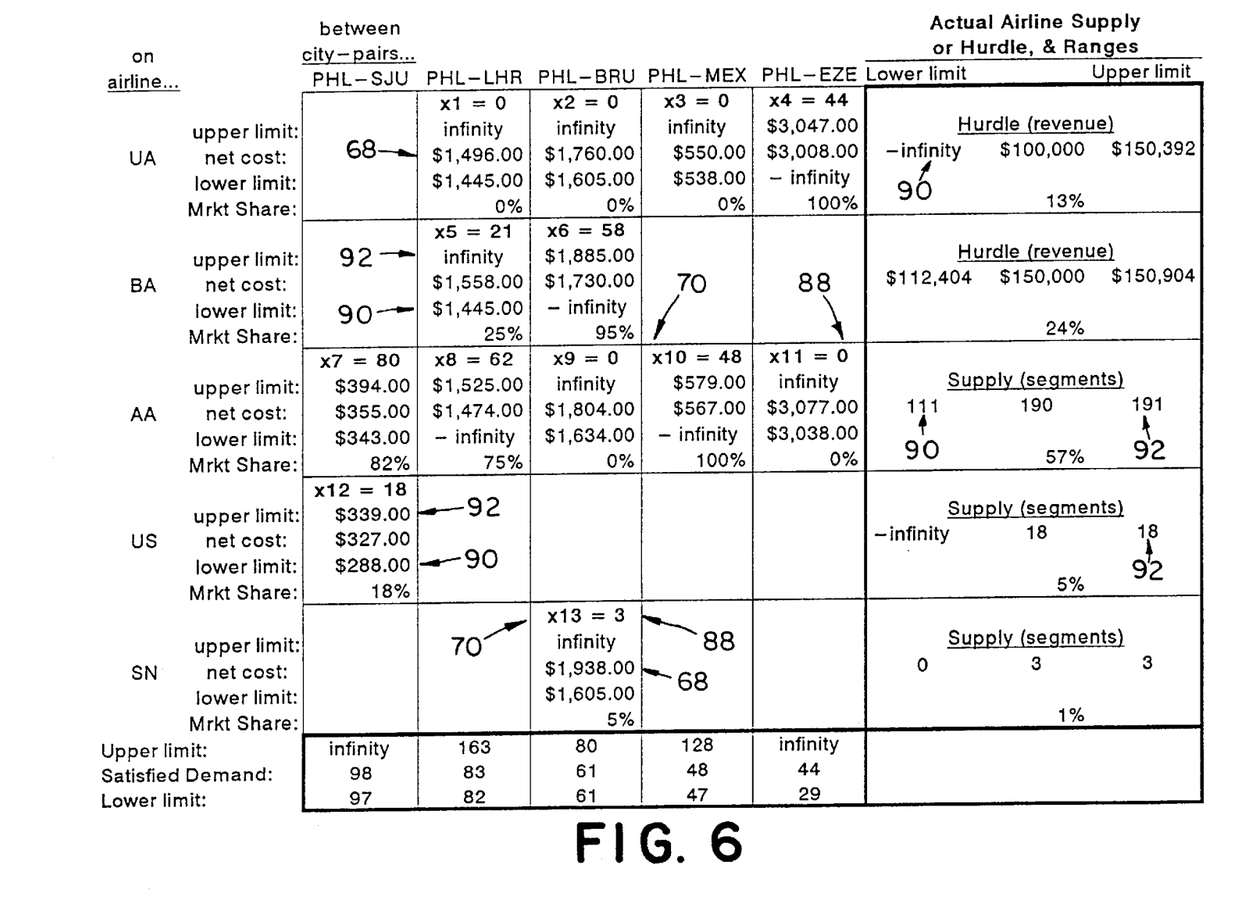
FIG. 6 shows a matrix or table comprising typical output information from the system of FIG. 1.

Preferably, the solution determined by the linear programming software is organized by the software in a table, as seen in FIG. 6, wherein the table corresponds to the table of the obtained information. Thus, easy reference may be made between the obtained information and the solution. As seen in FIG. 6, the solution comprises a solution value 88 for each variable 70.

Preferably, the solution also comprises lower and upper limits 90, 92 for each link demand value, carrier supply value, carrier goal value, and weighted value 68 (the weighted values 68 are shown as "net cost" in the table of FIG. 6). The lower and upper limits 90, 92 may be determined by the linear programming software. As may be recognized, each value may be adjusted between the limits 90, 92 while still maintaining the determined solution. However, should a value change beyond a respective lower or upper limit 90, 92, the solution representing the minimum cost to the organization will have changed and a new solution must be determined.

Once the processor 12 determines the solution of the objective function that satisfies the constraints and that minimizes the travel cost to the organization, the computer system 10 preferably generates a report representative of the solution, as seen at step 305 of FIG. 3. The generated report may be output via the printer 38, the disk drive 44, the scanner or fax 50, the monitor 42, and/or other means. Further, the generated report may be stored in the main memory 34 or the longer term storage 36.

The report may take the form of the table shown in FIG. 6. Additionally, the report may include the table of FIG. 5. However, one skilled in the art will recognize that the report may present the solution in any of a plurality of ways using some or all of the obtained information, the solution values 88, the upper and lower limits 90, 92, and other information.

Once a report has been generated and reviewed, it may be determined that, for a plurality of reasons, a particular value should be changed. For example, a particular carrier goal value may have been set too high or too low, a hurdle 84 may have been changed, or a link may have been removed from consideration, among other things. Additionally, it may be recognized that a particular goal is unrealistic or inappropriate and should be ignored. In response to such a change, the information may be adjusted and a new solution may be obtained.

It will be realized that several iterations of such a process may be necessary before a travel scheme is determined wherein the travel costs of the organization are minimized to the greatest extent possible. Once such a travel scheme is determined, the scheme must be implemented in order to realize the benefits thereof.

As may be recognized, travel arrangements made in connection with traveling on behalf of the organization may be set via a travel department of the organization, if one exists, or a travel agency of the organization. Accordingly, the implementation of the travel scheme requires that the travel department or travel agency be aware of the travel scheme, or at least the relevant portions of the travel scheme. For example, a travel agency setting travel arrangements for an employee wishing to travel the PHL-BRU link should at least be aware that carriers DA and SN are preferred. Additionally, the agency should be aware whether carriers BA or SN have already supplied the respective preferred number of travel trips 58 or 3, as determined by the solution values 88. As will be recognized, other information may be provided, preferably on a need to know basis.

In order that the travel agency be made aware of the necessary information from the travel scheme, the information must be communicated to the agency. Since a travel agency typically accesses travel information from a CRS 14 via a point of sale terminal (not shown), it is preferable that the information from the travel scheme be communicated from the computer system 10 to the travel agency point of sale terminal via the CRS 14.

The computer system and method described above may be employed by a travel agency to provide a travel optimization service to one or more organizations, and the travel agency may charge a fee to each organization for providing the service. As may be recognized, at least a portion of the fee may comprise a portion of the savings realized to the organization by employing the travel optimization service.

In the foregoing description, it can be seen that the present invention comprises a new and useful computer system and method for determining a travel scheme that minimizes the travel costs of an organization. It will be appreciated by those skilled in the art that changes could be made to the embodiment described above without departing from the broad inventive concepts thereof. It is understood, therefore, that this invention is not limited to the particular embodiment disclosed, but it is intended to cover modifications within the spirit and scope of the present invention as defined by the appended claims.

I claim:

1. In a computer system having a data input device, a data storage device, and a processor, a method for determining a travel scheme for minimizing travel costs for an organization, where the organization expects to purchase travel trips for a plurality of travelers for a plurality of predetermined travel links, each travel link comprising a travel origin and a travel destination, each travel link being served by at least one of a plurality of travel carriers, the method comprising the steps of:

obtaining travel information relating to the carriers and the links via the data input device;

storing the travel information via the data storage device;

constructing an objective function from the travel information via the processor, the objective function representing a travel cost to the organization to purchase travel trips for the plurality of travelers for the plurality of predetermined links;

constructing a set of constraints from the travel information via the processor, the constraints comprising restrictions relating to the objective function;

applying the constraints to the objective function via the processor to determine a solution of the objective function that satisfies the constraints and that minimizes the travel costs of the organization; and applying the solution as the travel scheme for minimizing travel costs by purchasing travel trips in accordance with the solution.

2. The computer system of claim 1 wherein the obtaining travel information step comprises the steps of:

obtaining travel cost information for each link for each carrier serving the link;

obtaining demand and supply information pertaining to a projected demand for each link and a projected supply for each carrier; and obtaining carrier goal information pertaining to any predetermined goal the organization has with respect to any of the carriers.

3. The computer system of claim 2 wherein the processor determines from the travel cost information for each link for each carrier serving the link a weighted value representing an actual cost to the organization for traveling the link using the carrier.

4. The computer system of claim 3 wherein the objective function comprises the sum of a travel cost for each link, the travel cost for each link comprising the sum of a travel cost for each carrier serving the link, the travel cost for each carrier serving the link comprising the weighted value representing the actual cost to the organization for traveling the link using the carrier multiplied by a variable representing a number of trips to be purchased from the carrier for the link.

5. The computer system of claim 4 wherein the solution comprises a solution value for each variable.

6. The computer system of claim 5 wherein the processor determines lower and upper limits for each constraint, each constraint being adjustable between the limits while maintaining the determined solution.

7. The computer system of claim 5 wherein the processor determines lower and upper limits for each solution value, each solution value being adjustable between the limits while maintaining the determined solution.

8. The computer system of claim 4 wherein the constraints are derived from the demand and supply information and the carrier goal information, the constraints comprising link demand constraints, carrier supply constraints, and carrier goal constraints, the link demand constraints requiring that for each link the sum of the variables representing the number of trips to be purchased from all carriers for the link be equal to the projected demand for the link, each carrier supply constraint requiring that for a particular carrier the sum of the variables representing the number of trips to be purchased from the carrier for all links be in a predetermined range, each carrier goal constraint requiring that the goal the organization has with respect to a particular carrier be accomplished.

9. The computer system of claim 2 wherein the processor determines the obtained information in the form of a table.

10. The computer system of claim 9 wherein the processor organizes organizing each of the plurality of links in a first direction on the table and each of the plurality of carriers in a second direction on the table, each carrier serving each link being designated by a cell on the table having information pertaining to the carrier serving the link.

11. The computer system of claim 10 wherein the processor organizes the link demand information according to each link and the carrier supply information and carrier goal information according to each carrier.

12. The computer system of claim 11 wherein the processor employs linear programming to apply the constraints to the objective function to determine the solution.

13. The computer system of claim 12 wherein the processor organizes the solution in the form of a table corresponding to the table of the obtained information.

14. The computer system of claim 2 wherein the obtaining travel cost information step comprises acquiring current travel data from a computerized reservation system.

15. The computer system of claim 2 wherein the obtaining travel cost information step comprises acquiring previously generated historical travel data from a historical travel data file.

16. The computer system of claim 2 wherein the obtaining demand and supply information and obtaining carrier goal information steps comprise acquiring the demand and supply information and the carrier goal information for the organization from a previously generated organization discount program data file.

17. The computer system of claim 1 wherein the processor employs linear programming to apply the constraints to the objective function to determine the solution.

18. A method for determining a travel scheme for minimizing travel costs for an organization, where the organization expects to purchase travel trips for a plurality of travelers for a plurality of predetermined travel links, each travel link comprising a travel origin and a travel destination, each travel link being served by at least one of a plurality of travel carriers, the method comprising the steps of:

obtaining travel information relating to the carriers and the links;

constructing an objective function from the travel information, the objective function representing a travel cost to the organization to purchase travel trips for the plurality of travelers for the plurality of predetermined links;

constructing a set of constraints from the travel information, the constraints comprising restrictions relating to the objective function;

applying the constraints to the objective function to determine a solution of the objective function that satisfies the constraints and that minimizes the travel costs of the organization; and applying the solution as the travel scheme for minimizing travel costs by purchasing travel trips in accordance with the solution.

19. The method of claim 18 wherein the obtaining travel information step comprises the steps of:

obtaining travel cost information for each link for each carrier serving the link;

obtaining demand and-supply information pertaining to a projected demand for each link and a projected supply for each carrier; and obtaining carrier goal information pertaining to any predetermined goal the organization has with respect to any of the carriers.

20. The method of claim 19 further comprising the step of determining from the travel cost information for each link for each carrier serving the link a weighted value representing an actual cost to the organization for traveling the link using the carrier.

21. The method of claim 20 wherein the objective function comprises the sum of a travel cost for each link, the travel cost for each link comprising the sum of a travel cost for each carrier serving the link, the travel cost for each carrier serving the link comprising the weighted value representing the actual cost to the organization for traveling the link using the carrier multiplied by a variable representing a number of trips to be purchased from the carrier for the link.

22. The method of claim 21 wherein the solution comprises a solution value for each variable.

23. The method of claim 22 further comprising the step of determining lower and upper limits for each constraint, each constraint being adjustable between the limits while maintaining the determined solution.

24. The method of claim 22 further comprising the step of determining lower and upper limits for each solution value, each solution value being adjustable between the limits while maintaining the determined solution.

25. The method of claim 21 wherein the constraints are derived from the demand and supply information and the carrier goal information, the constraints comprising link demand constraints, carrier supply constraints, and carrier goal constraints, the link demand constraints requiring that for each link the sum of the variables representing the number of trips to be purchased from all carriers for the link be equal to the projected demand for the link, each carrier supply constraint requiring that for a particular carrier the sum of the variables representing the number of trips to be purchased from the carrier for all links be in a predetermined range, each carrier goal constraint requiring that the goal the organization has with respect to a particular carrier be accomplished.

26. The method of claim 19 further comprising the step of organizing the obtained information in the form of a table.

27. The method of claim 26 wherein the organizing step comprises organizing each of the plurality of links in a first direction on the table and each of the plurality of carriers in a second direction on the table, each carrier serving each link being designated by a cell on the table having information pertaining to the carrier serving the link.

28. The method of claim 27 wherein the organizing step further comprises organizing the link demand information according to each link and the carrier supply information and the carrier goal information according to each carrier.

29. The method of claim 28 further comprising the step of employing linear programming to apply the constraints to the objective function to determine the solution.

30. The method of claim 29 further comprising the step of organizing the solution in the form of a table corresponding to the table of the obtained information.

31. The method of claim 19 wherein the obtaining travel cost information step comprises acquiring current travel data from a computerized reservation system.

32. The method of claim 19 wherein the obtaining travel cost information step comprises acquiring previously generated historical travel data from a historical travel data file.

33. The method of claim 19 wherein the obtaining demand and supply information and obtaining carrier goal information steps comprise acquiring the demand and supply information and the carrier goal information for the organization from a previously generated organization discount program data file.

34. The method of claim 18 further comprising the step of employing linear programming to apply the constraints to the objective function to determine the solution.

35. A computer system for determining a travel scheme for minimizing travel costs for an organization, where the organization expects to purchase travel trips for a plurality of travelers for a plurality of predetermined travel links, each travel link comprising a travel origin and a travel destination, each travel link being served by at least one of a plurality of travel carriers, the system comprising:

a data input device for receiving travel information relating to the carriers and the links;

a data storage device for storing the travel information received by the data input device;

a programmed processor for constructing an objective function from the travel information, the objective function representing a travel cost to the organization to purchase travel trips for the plurality of travelers for the plurality of predetermined links; and a programmed processor for constructing a set of constraints from the travel information, the constraints comprising restrictions relating to the objective function;

the processor for applying the constraints to the objective function to determine a solution of the objective function that satisfies the constraints and that minimizes the travel costs the organization;

the solution for being applied as the travel scheme for minimizing travel costs by purchasing travel trips in accordance with the solution.

36. The computer system of claim 35 wherein the travel information comprises travel cost information for each link for each carrier serving the link, demand and supply information pertaining to a projected demand for each link and a projected supply for each carrier, and carrier goal information pertaining to any predetermined goal the organization has with respect to any of the carriers.

37. The computer system of claim 36 wherein the processor determines from the travel cost information for each link for each carrier serving the link a weighted value representing an actual cost to the organization for traveling the link using the carrier.

38. The computer system of claim 37 wherein the objective function comprises the sum of a travel cost for each link, the travel cost for each link comprising the sum of a travel cost for each carrier serving the link, the travel cost for each carrier serving the link comprising the weighted value representing the actual cost to the organization for traveling the link using the carrier multiplied by a variable representing a number of trips to be purchased from the carrier for the link.

39. The computer system of claim 38 wherein the solution comprises a solution value for each variable.

40. The computer system of claim 39 wherein lower and upper limits for each constraint are determined by the processor, each constraint being adjustable between the limits while maintaining the determined solution.

41. The computer system of claim 39 wherein lower and upper limits for each solution value are determined by the processor, each solution value being adjustable between the limits while maintaining the determined solution.

42. The computer system of claim 38 wherein the constraints are derived from the demand and supply information and the carrier goal information, the constraints comprising link demand constraints, carrier supply constraints, and carrier goal constraints, the link demand constraints requiring that for each link the sum of the variables representing the number of trips to be purchased from all carriers for the link be equal to the projected demand for the link, each carrier supply constraint requiring that for a particular carrier the sum of the variables representing the number of trips to be purchased from the carrier for all links be in a predetermined range, each carrier goal constraint requiring that the goal the organization has with respect to a particular carrier be accomplished.

43. The computer system of claim 42 wherein the goal constraint comprises a predetermined discount from a particular carrier only if the carrier receives a minimum predetermined amount of business from the organization.

44. The computer system of claim 36 wherein the information retrieved by the processor is organized in the form of a table.

45. The computer system of claim 44 wherein the table is organized with each of the plurality of links laid out in a first direction and each of the plurality of carriers laid out in a second direction, each carrier serving each link being designated by a cell having information pertaining to the carrier serving the link.

46. The computer system of claim 45 wherein the link demand information is organized according to each link and wherein the carrier supply information and the carrier goal information is organized according to each carrier.

47. The computer system of claim 46 further comprising software for extracting information from the table to construct the objective function and the set of constraints and linear programming software for applying the constraints to the objective function to determine the solution.

48. The computer system of claim 47 wherein the solution is organized in the form of a table corresponding to the table of the obtained information.

49. The computer system of claim 36 further comprising a means for acquiring travel data from a computerized reservation system, wherein the travel cost information for each link for each carrier serving the link is compiled at least in part from the travel data.

50. The computer system of claim 36 further comprising a generated historical travel data file having historical travel data, wherein the travel cost information for each link for each carrier serving the link is compiled at least in part from the historical travel data.

51. The computer system of claim 36 further comprising a generated organization discount program data file having the demand and supply information and the carrier goal information for the organization.

52. The computer system of claim 36 wherein the travel cost information for each link for each carrier serving the link includes a member of the group selected from an expected fare the carrier charges for traveling the link, any discounts the carrier provides to the organization, any added costs in connection with traveling the link using the carrier, any benefits received in connection with traveling the link using the carrier, the number of non-stop voyages available, the number of connecting voyages available, any expected transfer delays, the percentage of total voyages the carrier provides for the link, and a combination thereof.

53. The computer system of claim 35 further comprising software executed on the processor for extracting information from the table to construct the objective function and the set of constraints and linear programming software for applying the constraints to the objective function to determine the solution.

54. A method for determining an optimum travel scheme for minimizing travel costs for traveling a plurality of travel links being served by a plurality of travel carriers by selectively allocating travel trips on each link to the carriers serving the link, comprising the steps of:

(a) determining travel information representative of the links and the carriers serving the links;

(b) determining constraints on allocating the trips to the carriers;

(c) prospectively allocating the trips among the carriers in accordance with the travel information and the constraints to provide a travel scheme;

(d) determining a cost of the travel scheme of step (c);

(e) ascertaining whether any of the travel information or constraints have changed;

(f) if any of the travel information or constraints have changed, then repeating steps (c), (d), and (e) until the optimum travel scheme minimizing the travel costs in accordance with the travel information and the constraints is determined; and (g) applying the optimum travel scheme to minimize travel costs by purchasing travel trips in accordance with such optimum travel scheme.

55. The method of claim 54 wherein the determining travel information step comprises the steps of:

obtaining travel cost information for each link for each carrier serving the link;

obtaining demand and supply information pertaining to a projected demand for each link and a projected supply for each carrier; and obtaining carrier goal information pertaining to any predetermined goal the organization has with respect to any of the carriers.

56. The method of claim 55 further comprising the step of determining from the travel cost information for each link for each carrier serving the link a weighted value representing an actual cost to the organization for traveling the link using the carrier.

57. The method of claim 56 wherein the cost of the travel scheme comprises a function representing the sum of a travel cost for each link, the travel cost for each link comprising the sum of a travel cost for each carrier serving the link, the travel cost for each carrier serving the link comprising the weighted value representing the actual cost to the organization for traveling the link using the carrier multiplied by a variable representing a number of trips to be purchased from the carrier for the link.

58. The method of claim 57 wherein the optimum travel scheme comprises a solution value for each variable.

59. The method of claim 58 further comprising the step of determining lower and upper limits for each constraint, each constraint being adjustable between the limits while maintaining the optimum travel scheme.

60. The method of claim 58 further comprising the step of determining lower and upper limits for each solution value, each solution value being adjustable between the limits while maintaining the optimum travel scheme.

61. The method of claim 57 wherein the constraints are derived from the demand and supply information and the carrier goal information, the constraints comprising link demand constraints, carrier supply constraints, and carrier goal constraints, the link demand constraints requiring that for each link the sum of the variables representing the number of trips to be purchased from all carriers for the link be equal to the projected demand for the link, each carrier supply constraint requiring that for a particular carrier the sum of the variables representing the number of trips to be purchased from the carrier for all links be in a predetermined range, each carrier goal constraint requiring that the goal the organization has with respect to a particular carrier be accomplished.

62. The method of claim 55 further comprising the step of organizing the obtained information in the form of a table.

63. The method of claim 62 wherein the organizing step comprises organizing each of the plurality of links in a first direction on the table and each of the plurality of carriers in a second direction on the table, each carrier serving each link being designated by a cell on the table having information pertaining to the carrier serving the link.

64. The method of claim 63 wherein the organizing step further comprises organizing the link demand information according to each link and the carrier supply information and the carrier goal information according to each carrier.

65. The method of claim 64 further comprising the step of employing linear programming to apply the constraints to a function representing the cost of the travel scheme to determine the optimum travel scheme.

66. The method of claim 65 further comprising the step of organizing the optimum travel scheme in the form of a table corresponding to the table of the obtained information.

67. The method of claim 55 wherein the obtaining travel cost information step comprises acquiring current travel data from a computerized reservation system.

68. The method of claim 55 wherein the obtaining travel cost information step comprises acquiring previously generated historical travel data from a historical travel data file.

69. The method of claim 55 wherein the obtaining demand and supply information and obtaining carrier goal information steps comprise acquiring the demand and supply information and the carrier goal information for the organization from a previously generated organization discount program data file.

70. The method of claim 54 further comprising the step of employing linear programming to determine a solution.

* * * * *